United States Patent [19]

Gallivan

[11] 4,432,915
[45] Feb. 21, 1984

[54] METHOD FOR PRODUCING NUCLEAR FUEL PELLETS, AND PRODUCT THEREOF

[75] Inventor: Timothy J. Gallivan, Wilmington, N.C.

[73] Assignee: General Electric Company, San Jose, Calif.

[21] Appl. No.: 360,630

[22] Filed: Mar. 22, 1982

[51] Int. Cl.³ .............................................. G21C 21/00
[52] U.S. Cl. .................................... 264/0.5; 252/638; 423/260
[58] Field of Search ................. 264/0.5; 252/638, 643; 423/260, 261

[56] References Cited

U.S. PATENT DOCUMENTS

| | | | |
|---|---|---|---|
| 3,803,273 | 4/1974 | Hill | 264/0.5 |
| 3,923,933 | 12/1975 | Lay | 264/0.5 |
| 3,927,154 | 12/1975 | Carter | 264/0.5 |
| 4,061,700 | 12/1977 | Gallivan | 264/0.5 |
| 4,383,953 | 5/1983 | Larson | 264/0.5 |

OTHER PUBLICATIONS

Feldman et al., Journal of the American Chemical Society, vol. 76, 1954, pp. 4726–4732.

*Primary Examiner*—Donald P. Walsh
*Attorney, Agent, or Firm*—Ivor J. James, Jr.; Samuel E. Turner; Raymond G. Simkins

[57] ABSTRACT

A method for improving the physical properties of pressed bodies or pellets formed of particulate nuclear fuel material containing uranium dioxide. The green or unfired pressed bodies comprise a fugitive binder dispersed through the particulate fuel material.

21 Claims, 1 Drawing Figure

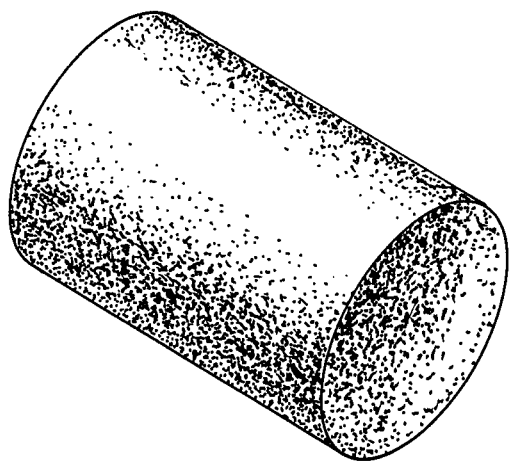

METHOD FOR PRODUCING NUCLEAR FUEL PELLETS, AND PRODUCT THEREOF

This invention relates to the manufacture of consolidated particulate ceramic materials comprising powders compressed into compacted, coherent and handleable bodies for subsequent sintering to produce integrated units or products therefrom. The invention particularly relates to a method of forming green or unsintered pellets of particulate fissionable nuclear fuel material having increased and more consistent levels of physical strength and integrity for enduring subsequent handling or processing, such as sintering and grinding to dimensions, and service in their final utilization.

Fissionable nuclear fuel for nuclear reactors comprise a variety of sources and forms of fissionable materials, including ceramic compounds of uranium, plutonium and thorium. Preferred fuel compounds for commercial energy generating reactors comprise oxides of uranium, plutonium and thorium, and mixtures thereof. The most suitable and commonly used fuel for such commercial reactors is uranium dioxide, which can be combined with minor amounts of other fuels and/or neutron flux controlling additives such as gadolinum.

Commercially produced uranium dioxide is a fine, fairly porous powder which is not suitable as such for use as fuel in commercial reactors. A number of means have been developed and used to make uranium dioxide powder suitable as a fuel for nuclear reactors. One technique has been to sinter appropriately sized bodies or pellets of the powdered uranium dioxide material at high temperatures to develop strong diffusion bonds between the individual particles.

However, the sintering technique for converting uranium dioxide powder into an apt form or mass suitable for use as reactor fuel requires a preliminary forming of the loose powder into a shaped, and self-retaining, unfired, or sometimes referred to as "green", body of sufficient strength and integrity to survive handling and the sintering procedure. The operation of consolidating fine particles into a coherent body or integrated mass with acceptable levels of rejects, and the strength and uniformity of such units of consolidated particles for enduring subsequent handling and firing has been a subect of considerable concern and investigation in the nuclear fuel industry.

Conventional organic or plastic binders commonly used in powder fabrication have been considered unsuitable in nuclear fuel processing operations. Entrainment of any binder residues such as carbon within the sintered nuclear fuel product is unacceptable in reactor service. Moreover, the presence of any organic binder among the particles inhibits the formation during sintering of strong diffusion bonds between the particles, and adversely affects the density of the sintered product. The complete removal of binders or their decomposition products prior to sintering is especially difficult, and usually requires a costly additional operation in the fuel manufacture.

Accordingly, a common method has been to die press uranium dioxide powder into appropriately sized green bodies or pellets without the assistance of any binder. This approach however has resulted in very costly high rates of rejects and scrap material recycling because of the weakness of green binder-free pellets of powder.

U.S. Pat. No. 4,061,700, issued Dec. 6, 1977, to Gallivan, and assigned to the same assignee as this application, discloses a group of fugitive binders that produce improved sintered pellets of powdered nuclear fuel materials for nuclear reactors. The fugitive binders of this patent function without contaminating the resulting fuel material, and they permit the formation of strong bonds between sintered particles during firing without deleteriously affecting the desired porosity of the fused mass.

The disclosure of the said U.S. Pat. No. 4,061,700, and of U.S. Pat. Nos. 3,803,273; 3,923,933; and 3,927,154, also assigned to the same assignee as the instant application, each relating to significant aspects in the subject field of producing nuclear fuel pellets or bodies from particulate fissionable ceramic material for reactor service, are all incorporated herein by reference.

The prior art techniques or means such as disclosed in U.S. Pat. No. 4,061,700, have been found wanting in some conditions and circumstances. For instance it has been observed that the fugitive binders of the aforesaid patent do not provide consistent results as to pellet strength and integrity irrespective of the blending conditions and particle characteristics of the uranium oxide material. Specifically the severity of working in blending, relative humidity and temperature, and duration of storage, and/or the uranium oxide particle properties such as size, surface area and moisture content are all factors that apparently can detract from the uniformity of the physical attributes provided by such fugitive binders.

SUMMARY OF THE INVENTION

This invention comprises a method for producing compressed bodies or pellets of particulate fissionable ceramic fuel material containing uranium oxide with a fugitive binder of a class of organic acids. The distinctive acid fugitive binders of this invention provide unfired or "green" compacted bodies or pellets of particulate fuel material having significantly more uniform and greater strength and physical integrity prior to firing, or in the green stage, and thereafter. The invention also includes the unique products of enhanced physical attributes derived from the method and the action of the novel organic acid fugitive binders with the uranium oxide.

OBJECTS OF THE INVENTION

It is an object of this invention to provide an improved method of manufacturing compacted, coherent and handleable bodies or pellets of nuclear fuel from particulate fissionable ceramic material, and the compressed products of such method.

It is also an object of this invention to provide a method of increasing the uniformity and level of strength and physical integrity of unfired or "green" compressed and coherent bodies or pellets of nuclear fuel comprising particulate fissionable material and a fugitive binder, and the physically enhanced products thereof.

It is a further object of this invention to provide a new and improved fugitive binder for consolidating particulate fissionable material containing uranium oxide into unfired or "green" coherent bodies or pellets having a high level and uniformity of physical strength and durability.

It is another object of this invention to provide a method for producing unfired or "green" bodies and pellets from particulate fissionable ceramic material comprising uranium oxide having enhanced and more uniform physical strength and resistance to die-pressing deformities, reduced physical impediments or flaws, and which are highly durable and handleable when subjected to factory production operations.

DESCRIPTION OF THE DRAWING

The drawing comprises a perspective view of a fuel pellet of this invention.

DETAILED DESCRIPTION OF THE INVENTION

This invention comprises a method for producing fissionable nuclear fuel pellets or coherent bodies from particulate material utilizing a fugitive binder, and the products of the method. The method includes forming green or unfired pellets or bodies from an admixture of the particulate material and fugitive binder for subsequent sintering into fused pellets or bodies of fissionable nuclear fuel suitable for fueling nuclear reactors.

The particulate fissionable nuclear fuel materials of the invention comprise the various materials used as nuclear fuels for nuclear reactors, including ceramic compounds such as oxides of uranium, plutonium and thorium. Preferred fuel compounds consist of uranium oxide, plutonium oxide, thorium oxide, and mixtures thereof, particularly uranium dioxide.

The particulate nuclear fuel material in the practice of the invention can include mixtures of one or more of the said oxides of uranium, plutonium and thorium with various additives. Neutron absorbing materials such as gadolinium are sometimes included to moderate neutron flux densities.

The fugitive binders of this invention consist of polyfunctional organic acids, and salts thereof, which contain both an organic acid —COOH group, and an alcohol —OH group. Examples of such acids for use in the practice of the invention comprise lactic acid, glycolic acid, tartaric acid, citric acid, malic acid, glyceric acid, mandelic acid, and hydroxybutyric acid. Salts of such acids especially include their ammonium salts, among others.

The polyfunctional acid binders of the invention appear to react chemically within the media of the powdered fuel, and it is deduced and believed that the acids form complex compounds with uranium to produce uranyl salts thereof, namely uranyl lactate, uranyl glycolide, uranyl tartarate, uranyl citrate, uranyl malate, uranyl glycerate, etc. Variations in the pH of the components or their media appear to alter the species of the formed complexes, with the high pH conditions generally forming more complex, longer chain polymers ranging from the 2:2 dimer at low pH levels to 3:2 trimer at higher pH levels.

This theory of chemical complex formation is considered to be supported by a publication relating to the polymerization of complex ions resulting from water solutions of uranyl nitrate with hydroxy carboxylic acids, and entitled "Polymerization Of Uranyl-Citrate-Malate-Tartartate and Lactate Complexes" by Feldman et al, *Journal of the American Chemical Society*, pages 4726–4732, Volume 76, 1954.

Most typical organic binders require a high water content or other vehicle or solvent for the purpose of dissolving the binder, completely wetting the components and distributing the binder. Unlike such typical binders, the polyfunctional acids of this invention require only very small water concentrations, generally about 5000 to about 7500 parts by weight per million, for their effective action. Such minimal amounts are ample to promote concentration gradient driven ion mobility with the polyfunctional acid to uranium dioxide concentrations utilized in the invention, whereby the polymerization chemical reaction induces homogeneity of the binder through the system.

Moreover, the minuscule water contents used in the practice of this invention obviates any drying step usually required to remove the water prior to die pressing a powder into a shaped body.

The reaction of the acid binder with uranium contents of the particulate fissionable fuel material produce a complex reaction product which provides the unique and advantageous binding action of this invention. The utilization of uranium fuel material in the formation of a binding phase or system for the particulate fuel material reduces the amount and weight percent of non fuel binder addition required for attaining satisfactory mechanical binding. This reduction in added binder also minimizes the quantity of hydrocarbons which must be volatilized in a furnace prior to densification of the ceramic body during the sintering operation.

Accordingly, the polyfunctional acid fugitive binders of this invention are admixed with the powdered fuel materials in effective amounts which range up to only about 3 percent by weight thereof for the attainment of markedly improved unfired or "green" pellets of high strength and durability. Preferred amounts of the fugitive binders of this invention for most situations comprise about 1 to about 2 percent by weight of the particulate nuclear fuel material.

The polyfunctional acid binders of this invention are preferably used in their acid form rather than salts since their acids react more rapidly and form a simple uranyl polyfunctional acid complex. The addition of ammonium carbamate, ammonium bicarbonate, ammonium carbonate, anhydrous ammonia, or ammonium hydroxide, along with the acid binder, increases the pH of the system promoting polymerization. Other salts or base anhydrides can be used provided they do not contribute undesirable cation impurities to the fissionable fuel material, such as sodium from sodium hydroxide. Lactic hydroxybutyric, mandelic, glyceric or glycolic acids which have one organic acid group and an alcohol group react with the uranium oxide to yield a powder with more plasticity, lower tensile strength, and better lubricity than do tartaric, citric, or malic acids which have two or more organic acid and alcohol groups. In many instances, the lubricity of lactic or glycolic complex containing uranium oxide powders is sufficient for die pressing without any additional lubrication aids. Mixtures of polyfunctional acids can also be utilized to achieve binders of intermediate mechanical properties.

To govern the densities of the sintered bodies of ceramic fuel material of this invention, pore formers such as ammonium oxalate or a uranium precursor such as ammonium diuranates can be added to the fuel material along with the binders in the practice of this invention. The pore formers, when used, are preferably reduced to a uniformly fine granular form and premixed with the particulate ceramic material.

The acid binders of this invention, and any other additions employed therewith, can be admixed with the powdered nuclear fuel material by any appropriate blending means or system that will attain good homogeneity with a powdered constituent and crystalline or heavy liquid additions. Ball mills and vibratory mills are examples.

Compressing of the powdered fissionable nuclear fuel admixed with the acid binders of this invention into consolidated green pellets or bodies can be effected with any conventional means of the art, such as the die-pressing in the aforementioned patents.

The following comprise examples of preferred and illustrated embodiments for the practice of this invention and demonstrations of the pronounced improvements in compressive tensile strengths and other values of the products produced thereby.

EXAMPLE 1

Five kilograms of uranium dioxide powder was ball milled in a 2½ gallon rubber lined jar for six hours with stainless steel milling media, and then die pressed into pellets. The resulting green pellet products were extremely weak. This process was repeated identically except for including 2 weight percent of ammonium bicarbonate. The die pressed pellets therefrom were improved but marginal in strength. This process was again repeated except with 1 weight percent of tartaric acid premixed for 10 minutes followed by the addition of 1 weight percent of ammonium bicarbonate. The resulting die pressed pellets exhibited excellent strength.

EXAMPLE 2

Fifteen kilograms of uranium dioxide powder was added to a three cubic foot vibratory mill containing two hundred pounds of ¾ inch diameter by ¾ inch long cylindrical aluminum oxide milling media. Next a solution of 2 percent tartaric acid and 1 percent water were added (uranium dioxide basis). The mill was energized for 1½ hours with a nitrogen atmosphere flowing. Subsequently, anhydrous ammonia was introduced to the mill and the nitrogen flow terminated. Milling proceeded for another 1½ hours. The powder was discharged and agglomerated by rolling thirty minutes in a five gallon pail. Pellets were pressed from the powder at 18,300; 23,500 and 36,500 psi compaction pressures. The diametral compression tensile strengths were 350, 345 and 370 psi, respectively—very high values. However, the resulting pellets were more brittle and somewhat prone to chipping.

EXAMPLE 3

Fifteen kilograms of the same source powder as Example 2, along with the 1½ percent lactic and ½ percent water, were milled for three hours under a nitrogen atmosphere in the three cubic foot vibratory mill with ¾ inch diameter cylindrical aluminum oxide media. The powder was again agglomerated by rolling in the five gallon pail and pressed into pellets at 18,300; 23,500 and 36,500 psi compaction pressures. Diametral compression tensile strengths were 22, 24 and 37 psi, respectively, which are very low values. The pellets were softer and easily dentable but chip resistant.

EXAMPLE 4

The same source uranium dioxide and additives were processed identically to Example 3, except that the nitrogen flow was terminated after 1½ hours of milling. Anhydrous ammonia flow was started and the mill energized for 1½ more hours. Thus, this example utilized pH increase with the anhydrous ammonia addition while Example 3 did not. The powder was agglomerated in a five gallon pail and pressed into pellets again at 18,300; 23,500 and 36,500 psi. The resulting diametral compression tensile strengths were 56, 69 and 84 psi, respectively. These values are significantly higher than the non-ammoniated acidic values of Example 3. The pressed pellets were not as soft as Example 3 but were dentable and highly chip resistant.

EXAMPLE 5

Fifteen kilograms of uranium dioxide powder was loaded into a vibratory mill containing two hundred pounds of ¾ inch diameter by ¾ inch long aluminum oxide cylinders. One weight percent lactic acid, one-half weight percent tartaric acid and five thousand ppm of water, all on a uranium dioxide basis, were added. The mill was energized for twenty minutes with a nitrogen atmosphere flowing through the mill. A sample of powder was removed from the mill and pressed into 0.520 inch diameter pellets with a 23,500 psi load. Mechanical properties of pellets measured in diametral compression resulted in a tensile strength of 21.5 psi, plastic deformation at failure of 19.0 microns, and elastic deformation at failure of 23.5 microns. The vibratory mill was restarted with an anhydrous $NH_3$ atmosphere and operated for one hour and forty minutes. Again pellets were pressed from the powder and mechanical properties measured in an identical manner. The resulting properties were tensile strength of 59.7 psi, plastic deformation at failure of 28.0 microns, and elastic deformation at failure of 31.0 microns. In contrast, as-received powder yielded mechanical properties of 50.0 psi tensile strength, 17.0 microns plastic deformation at failure and 30.0 microns of elastic deformation at failure. The lactic-tartaric acid binder with the milling and ammonia treatment increased the tensile strength by 19.4 percent and the plastic deformation by 64.7 percent. There was virtually no change in elastic deformation. This 1 percent lactic acid, ½ percent tartaric acid, and ½ percent water composition exhibited superior pressability when compared to the 2 percent tartaric acid, ½ percent water of Example 2 and to the 1½ percent lactic acid, ½ percent water of Example 4.

EXAMPLE 6

Five hundred grams of uranium dioxide powder along with ½ weight percent glycolic acid were placed in a sixteen ounce polyethelene jar which was half full of ½ inch nylon spheres. The jar with its contents was blended in a paint shaker for ten minutes. The nylon spheres were then removed by screening and the powder divided into two equal batches. One batch was treated with $N_2$ and the other with anhydrous $NH_3$ for ten minutes. Several 0.520 inch diameter pellets pressed at 23,500 pounds load from the powder yielded the following mechanical properties in diametral compression:

| $N_2$ Atmosphere | 49.8 psi tensile strength, 38$\mu$ plastic strain, and 31$\mu$ elastic strain |
|---|---|
| $NH_3$ Atmosphere | 50.5 psi Tensile strength, 44$\mu$ plastic strain, and 34$\mu$ elastic strain |

As a reference, uranium dioxide processed in identical manner without glycolic acid produced values of:
30.6 psi tensile strength, 14$\mu$ plastic strain, and 23$\mu$ elastic strain A significant increase in tensile strength and plasticity results from the NH₃ treatment of ½ percent glycolic acid additions to uranium dioxide. Both this example and Example 7, which follows, demonstrate that the addition of single acid group polyfunctional acids provides excellent binding at concentrations as low as ½ percent without the addition of extra water. This is a significant advantage for binder removal during sintering.

EXAMPLE 7

One-half weight percent lactic acid was utilized as a binder in an exact experimental duplication of the procedure of Example 6. The results are as follows:

| | |
|---|---|
| ½ percent Lactic Acid N₂ Atmosphere | 28.0 psi tensile strength, 14μ plastic strain, 21.5μ elastic deformation |
| ½ percent Lactic Acid NH₃ Atmosphere | 51.2 psi tensile strength, 14μ plastic strain, 30.0μ elastic deformation |

I claim:

1. A method for producing fissionable nuclear fuel pellets containing uranium oxide, comprising the steps of:
   (a) admixing a powdered nuclear fuel material containing uranium oxide with a fugitive binder comprising a polyfunctional acid having both an organic acid group and an alcohol group to provide a substantially uniform dispersion of said binder within the powdered nuclear fuel material; and
   (b) forming the resulting admixture by pressing into a coherent body.

2. The method of claim 1 wherein the fugitive binder comprises at least one polyfunctional acid selected from the group consisting of lactic acid, glycolic acid, tartaric acid, citric acid, malic acid, glyceric acid, mandelic acid, and hydroxybutyric acid.

3. The method of claim 2, wherein the fugitive binder comprises salts of said acids.

4. The method of claim 2, wherein the fugitive binder comprising at least one polyfunctional acid is included in amounts of up to about 3 percent by weight of the uranium dioxide contents.

5. A method for producing fissionable nuclear fuel pellets containing uranium dioxide, comprising the steps of:
   (a) admixing a powdered nuclear fuel material containing uranium dioxide with up to about 3 percent by weight of the uranium dioxide of a fugitive binder comprising a polyfunctional acid having both an organic acid group and an alcohol group to provide a substantially uniform dispersion of said binder within the powdered nuclear fuel material; and
   (b) forming the resulting admixture by pressing into a coherent body.

6. The method of claim 5, wherein the fugitive binder comprises at least one polyfunctional acid selected from the group consisting of lactic acid, glycolic acid, tartaric acid, citric acid, malic acid, glyceric acid, mandelic acid, and hydroxybutyric acid, and salts thereof.

7. The method of claim 5, wherein an auxiliary fugitive binder comprised of ammonium bicarbonate, ammonium carbonate, ammonium bicarbonate carbamate, ammonium sesquicarbonate, ammonium carbamate, and mixtures thereof, is admixed with the powdered nuclear fuel material and polyfunctional acid fugitive binder.

8. The method of claim 5, wherein the polyfunctional acid of the fugitive binder is an ammonium salt of said acids.

9. The method of claim 5, wherein the fugitive binder of a polyfunctional acid is admixed with the powdered nuclear fuel material in amounts of about 1 to about 2 percent by weight of the uranium dioxide content thereof.

10. A method for producing fissionable nuclear fuel pellets containing uranium dioxide, comprising the steps of:
    (a) admixing a powdered nuclear fuel material containing uranium dioxide with about 1 to about 2 percent of a fugitive binder, based on the weight of the uranium dioxide, comprising at least one polyfunctional organic acid or salt thereof selected from the group consisting of lactic acid, glycolic acid, tartaric acid, citric acid, malic acid, glyceric acid, mandelic acid, and hydroxybutyric acid to provide a substantially uniform dispersion of said binder within the powdered fuel material; and
    (b) forming the resulting admixture by pressing into a coherent body.

11. A coherent body of consolidated particles comprising the product of admixing a powdered nuclear fuel material containing uranium oxide with a fugitive binder comprising a polyfunctional acid having both organic acid groups and an alcohol group, and forming the admixture into a compressed body.

12. The coherent body of claim 11, wherein the fugitive binder comprises at least one polyfunctional acid selected from the group consisting of lactic acid, glycolic acid, tartaric acid, citric acid, malic acid, glyceric acid, mandelic acid, and hydroxybutyric acid.

13. The coherent body of claim 12, wherein the fugitive binder comprises a salt of said acids.

14. The coherent body of claim 11, wherein the fugitive binder comprises at least one polyfunctional acid is included in amounts of up to about 3 percent by weight of the uranium dioxide contents.

15. A coherent body of consolidated particles comprising the product of admixing a powdered nuclear fuel material containing uranium dioxide with up to about 3 percent by weight of the uranium dioxide of a fugitive binder comprising a polyfunctional acid having both an organic acid group and an alcohol group, and forming the admixture into a compressed body.

16. The coherent body of claim 15, wherein the fugitive binder comprises at least one polyfunctional acid selected from the group consisting of lactic acid, glycolic acid, tartaric acid, citric acid, malic acid, glyceric acid, mandelic acid, and hydroxybutyric acid, and salts thereof.

17. The coherent body of claim 15, wherein the product comprises an auxiliary binder comprised of ammonium bicarbonate, ammonium carbonate, ammonium carbamate, ammonium sesquicarbonate, ammonium carbamate, and mixtures thereof, admixed with the powdered nuclear fuel material and polyfunctional acid fugitive binder.

18. The coherent body of claim 15, wherein the polyfunctional binder of the fugitive binder is an ammonium salt of said acids.

19. The coherent body of claim 15, wherein the fugitive binder of a polyfunctional acid is admixed with the powdered nuclear fuel material in amount of about 1 to about 2 percent by weight of the uranium dioxide content thereof.

20. A coherent body of consolidated particles comprising the product of admixing a powdered nuclear fuel material containing uranium dioxide with about 1 to about 2 percent by weight of the uranium dioxide of a fugitive binder comprising at least one polyfunctional organic acid or salt thereof selected from the group consisting of lactic acid, glycolic acid, tartaric acid, citric acid, malic acid, glyceric acid, and mandelic acid, and hydroxybutyric acid, and forming the admixture into a compressed body.

21. The coherent body of claim 20, wherein the salt of said organic acid is an ammonium salt.

* * * * *